(12) United States Patent
Carnevali (10) Patent No.: US 7,997,554 B2
(45) Date of Patent: Aug. 16, 2011

(54) ADAPTIVE MOUNTING STRUCTURE

(76) Inventor: Jeffrey D. Carnevali, Seattle, WA (US)

( * ) Notice: Subject to any disclaimer, the term of this patent is extended or adjusted under 35 U.S.C. 154(b) by 604 days.

(21) Appl. No.: 12/079,736

(22) Filed: Mar. 28, 2008

(65) Prior Publication Data

US 2009/0242719 A1 Oct. 1, 2009

(51) Int. Cl.
*A45D 42/14* (2006.01)
(52) U.S. Cl. ...................... 248/363; 248/346.2
(58) Field of Classification Search .......... 248/363, 248/346.06, 346.2, 910, 346.01, 362; 128/869
See application file for complete search history.

(56) References Cited

U.S. PATENT DOCUMENTS

| | | | |
|---|---|---|---|
| 1,757,529 A | 5/1930 | Jones | |
| 3,240,525 A | 3/1966 | Wood | |
| 3,745,998 A * | 7/1973 | Rose | 602/6 |
| 4,294,424 A * | 10/1981 | Teissier | 248/362 |
| 4,606,524 A | 8/1986 | Conee | |
| 4,657,003 A * | 4/1987 | Wirtz | 128/869 |
| 4,663,210 A | 5/1987 | Schreiber et al. | |
| 5,184,858 A | 2/1993 | Arai | |
| 5,350,147 A | 9/1994 | Paganus | |
| 5,639,134 A | 6/1997 | Rusch et al. | |
| 5,845,885 A | 12/1998 | Carnevali | |
| 6,330,992 B1 | 12/2001 | Swayhoover et al. | |
| 6,439,530 B1 | 8/2002 | Schoenfish et al. | |
| 6,581,892 B2 | 6/2003 | Carnevali | |
| 6,666,420 B1 | 12/2003 | Carnevali | |
| 6,840,487 B2 | 1/2005 | Carnevali | |
| 7,682,543 B2 | 3/2010 | Carnevali | |
| 2008/0203263 A1 | 8/2008 | Carnevali | |
| 2009/0108166 A1 * | 4/2009 | Fan | 248/503 |

* cited by examiner

*Primary Examiner* — Anita M King
(74) *Attorney, Agent, or Firm* — Charles J. Rupnick, Attorney at Law (57) ABSTRACT

The disclosure describes a device that effectively mounts and secures objects to nonplanar surfaces, and in particular effectively mounts and secures objects in a quick and efficient manner to complex contours of different automotive vehicle dashboard and other interior vehicle surfaces having differing coverings of differing textures. By example and without limitation, this novel adaptive mounting device includes a substantially flexible container forming a vacuum chamber containing and substantially filled with a substantially granular substance. A mounting structure having a frame supporting a presentation structure is joined to the bladder with at least a coupler or other presentation structure external of the bladder. A substantially air impermeable seal is formed between the bladder and a portion of the frame, and at least a partial vacuum is formed within the bladder.

The disclosure also describes a method for manufacturing the device described herein.

20 Claims, 7 Drawing Sheets

ADAPTIVE MOUNTING STRUCTURE

FIELD OF THE INVENTION

The present invention relates to the field of temporary mounts for securing objects to nonplanar surfaces, and in particular to temporary mounts for securing objects to automotive vehicle dashboard and other interior surfaces having pronounced complex contours and coverings of differing textures of vacuum-formed ABS or PVC sheet or coverings made of foamed sheet, synthetic leather-like materials such as vinyl, leather, imitation leather, textile fabric, or the like.

BACKGROUND OF THE INVENTION

Suction cup mounts are generally well-known and commonly used to temporarily mount and secure objects to hard smooth surfaces such as the surfaces of glass, plastic, Formica, glazed tile, metal, and other hard smooth surfaces. A vehicle's windshield is one convenient surface that lends itself to mounting a suction cup device. However, paraphernalia mounted on the windshield may interfere with a driver's vision and is expected to raise safety concerns.

Unfortunately, interiors of automotive and other vehicles provide few other hard smooth surfaces appropriate for mounting a suction cup, especially within view of the driver. As disclosed by Schreiber, et al. in U.S. Pat. No. 4,663,210 "Paneling Member For The Interior Of Automotive Vehicles, Especially A Dashboard" issued May 5, 1987, which is incorporated herein by reference, modern vehicle dashboards generally have a rigidifying supporting member molded into a semi-hard polyurethane foam body, usually having pronounced artistic contours. The foam body is covered on the side facing the passenger compartment with a covering of vacuum-formed ABS or PVC sheet of differing colors and textures. Alternatively, the covering is made of foamed sheet, synthetic leather-like materials such as vinyl, leather, imitation leather, textile fabric, or the like.

These foam-covered pronounced artistic contours and synthetic imitation finishes provide few other hard smooth surfaces appropriate for mounting a suction cup. Thus, temporarily mounting and securing objects to automotive vehicle interior surfaces is often problematic.

SUMMARY OF THE INVENTION

The present invention overcomes limitations of the prior art by providing a novel adaptive mounting device that effectively mounts and secures objects to nonplanar surfaces, and in particular effectively mounts and secures objects in a quick and efficient manner to complex contours of different automotive vehicle dashboard and other interior vehicle surfaces having differing coverings of differing textures.

According to one aspect of the invention, in its broad aspect this novel adaptive mounting device includes a substantially flexible container formed of a substantially air impermeable material and forming a vacuum chamber therewithin, vacuum chamber containing and substantially filled with a substantially granular substance. A mounting structure having a frame supporting a presentation structure is joined to the bladder with at least a coupler or other presentation structure external of the bladder. A substantially air impermeable seal is formed between the bladder and a portion of the frame, and at least a partial vacuum is formed within the bladder.

According to another aspect of this novel adaptive mounting device, the device further includes a sealable airway into the vacuum chamber, and a substantially air impermeable seal sealing the sealable airway.

According to another aspect of this novel adaptive mounting device, the device further includes a manual vacuum pump coupled to the frame, and a suction channel formed between an intake of the vacuum pump and the vacuum chamber of the bladder.

According to another aspect of this novel adaptive mounting device, the device further includes a manual vacuum release control valve in fluid communication with the vacuum chamber.

According to another aspect of this novel adaptive mounting device, the frame of the device further includes further comprises a universal mounting surface. By example and without limitation, the universal mounting surface further includes at least a substantially smooth and flat suction cup mounting surface. Alternatively, the universal mounting surface further includes at least a plurality of blind mounting holes, either alone or in combination with the suction cup mounting surface.

According to another aspect of this novel adaptive mounting device, at least a portion of the plurality of blind mounting holes further form a pattern of blind holes having substantially smooth bores for receiving conventional self-tapping screw fasteners.

According to another aspect of this novel adaptive mounting device, a method is provided for forming an adaptive mounting device, the method includes: depositing a granular substance into a bladder formed of a flexible and substantially air impermeable material and forming a vacuum chamber therewithin, and substantially filling the vacuum chamber with the granular substance; joining a mounting structure to the bladder with at least a presentation structure portion of the mounting structure being external of the bladder; forming a substantially air impermeable seal between the bladder and a portion of the mounting structure; and forming at least a partial vacuum within the bladder.

According to another aspect of this method for forming the novel adaptive mounting device, the forming at least a partial vacuum within the bladder is practiced subsequently to the forming a substantially air impermeable seal between the bladder and a portion of the mounting structure.

According to another aspect of this method for forming the novel adaptive mounting device, the method further includes coupling a manual vacuum generator to the mounting structure in fluid communication with the bladder; and the forming at least a partial vacuum within the bladder further includes manually operating the vacuum generator.

According to another aspect of this method for forming the novel adaptive mounting device, the method further includes coupling a manual vacuum release in fluid communication with the bladder; and manually releasing the at least partial vacuum within the bladder.

According to another aspect of this method for forming the novel adaptive mounting device, the method further includes alternately manually operating the vacuum generator for forming at least a partial vacuum within the bladder, and manually operating the vacuum release for releasing the at least a portion of the partial vacuum within the bladder.

Other aspects and objects, features, and advantages of the invention will be apparent in the written description which follows.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 8 and 9 illustrate the novel adaptive mounting device, wherein a piston portion of the manual vacuum pump is illustrated as being pushed into a cylinder portion of the manual vacuum pump against a spring, which compresses air in the cylinder while a check valve allows compressed air to escape out of the cylinder, wherein FIG. 8 illustrates the piston near a midpoint of the cylinder, and FIG. 9 illustrates the piston near a maximum extent of the cylinder;

DETAILED DESCRIPTION OF PREFERRED EMBODIMENT

In the Figures, like numerals indicate like elements.

The terms "up" and "down" and "right" and "left" and derivatives are used solely for clarity in describing the invention and relate to the relative orientation of the individual components shown in the Figures and the assembly relative to a surface to which it is attached.

The present invention is a universal mounting device that effectively mounts and secures objects to automotive vehicle interior surfaces in a quick and efficient manner.

Figure 1:
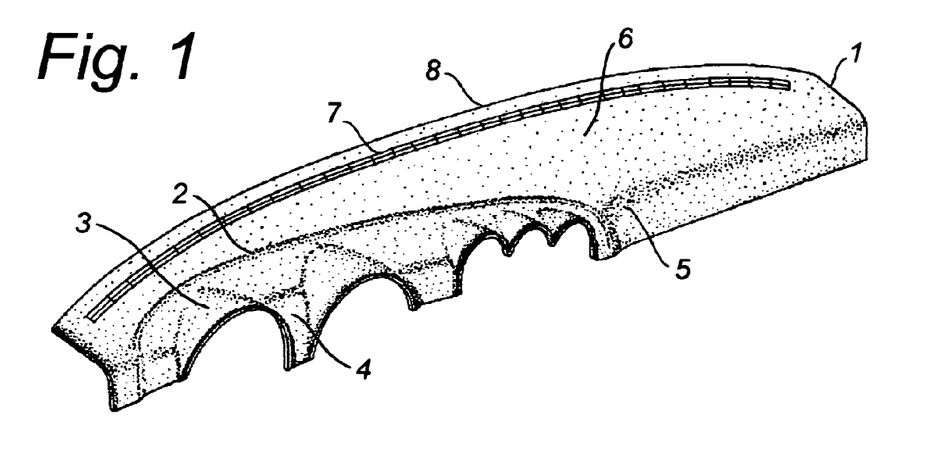
FIG. 1 is a perspective view of an exemplary automotive vehicle dashboard.

FIG. 1 is an exemplary illustration of a conventional automotive or other vehicle dashboard 1 having by example and without limitation pronounced and complex contours 2. The contours 2 of many such vehicle dashboards 1 include adjacent peaks 3 and valleys 4 with other portions being formed with wide areas of gentle curves 5 and relatively smooth fields 6. Many such vehicle dashboards 1 also include a set of louvers 7 shown here near a forward edge 8 adjacent to where a windshield is positioned when the dashboard 1 is mounted in a vehicle.

As discussed herein above and disclosed in U.S. Pat. No. 4,663,210, which is incorporated herein by reference, such a vehicle dashboard 1 generally has a rigidifying supporting member molded into a semi-hard polyurethane foam body, usually having pronounced artistic contours. The foam body is covered on the side facing the passenger compartment with a covering of vacuum-formed ABS or PVC sheet of differing colors and textures. Alternatively, the covering is made of foamed sheet, synthetic leather-like materials such as vinyl, leather, imitation leather, textile fabric, or the like. Such contours and finishes generally make problematic temporarily mounting and securing objects to automotive vehicle interior surfaces.

Figure 2:
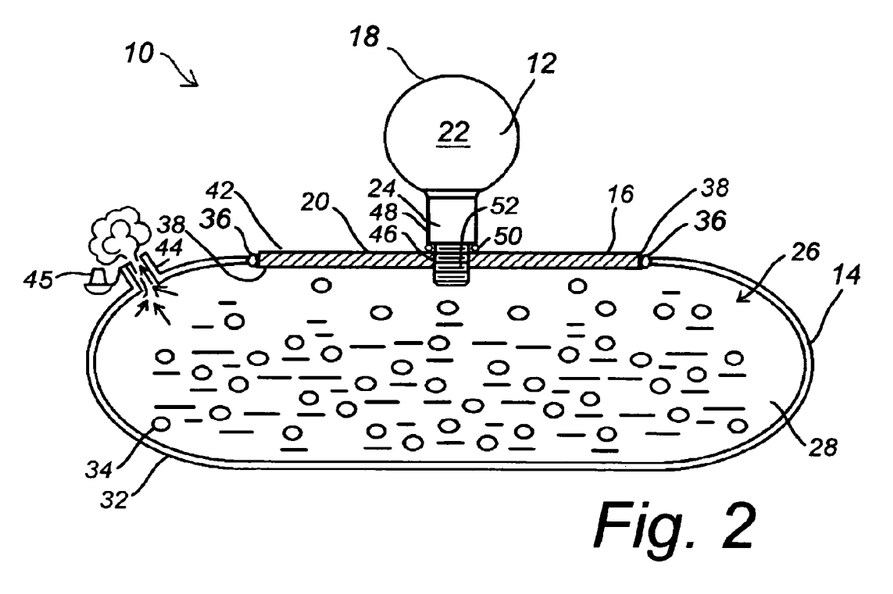
FIG. 2 illustrates by example and without limitation a novel adaptive mounting device that effectively mounts and secures objects in a quick and efficient manner to surfaces having pronounced and complex contours.

FIG. 2 illustrates by example and without limitation a novel adaptive mounting device 10 that effectively mounts and secures objects to automotive vehicle interior surfaces, such as the pronounced and complex contours 2 of the automotive vehicle dashboard 1, in a quick and efficient manner.

In the exemplary embodiment illustrated here, the novel adaptive mounting device 10 includes a mounting structure 12 coupled to a malleable base structure 14. The mounting structure 12 includes a frame 16 holding a coupler or other presentation structure 18 for mounting different paraphernalia.

By example and without limitation, the presentation structure 18 is optionally a ball-end mount or "coupler" of the type disclosed by Jeffrey D. Carnevali, the inventor of the present mounting device 10, in U.S. Pat. No. 5,845,885, entitled "Universally Positionable Mounting Device," issued Dec. 8, 1998, the complete disclosure of which is incorporated herein by reference. For example, when formed as a coupler, the presentation structure 18 is optionally formed having a substantially smooth, part-spherical head 22 of a pressure deformable, resilient elastomeric material, which renders the part-spherical head 22 relatively resiliently radially compressible. Alternatively, the part-spherical head 22 is formed of a substantially rigid material and having a plurality of discrete triangular surfaces as disclosed by example and without limitation in U.S. Pat. No. 6,581,892, entitled "Geodesic Mounting Apparatus," issued to Jeffrey D. Carnevali, the inventor of the present mounting device 10, on Jun. 24, 2003, the complete disclosure of which is incorporated herein by reference. Other presentation structures 18, such as pins, rods or plates as well as proprietary structures, are also contemplated and are considered equivalent structures and are substituted therefore without departing from the scope and intent of the invention.

By example and without limitation, the frame 16 includes a substantially rigid base plate 20, and the head 22 of the presentation structure 18 is extended from the plate 20 on a relatively upstanding reduced diameter stem or "neck" 24. By example and without limitation, the plate 20 is formed of a substantially rigid material such as metal or a hard plastic that is injection moldable. The presentation structure 18 is optionally formed as an integral portion of the plate 20. For example, the reduced diameter stem or neck 24 is integrally molded with the plate 20. When the head 22 is formed of a pressure deformable, resilient elastomeric material, as disclosed by U.S. Pat. No. 5,845,885, which is incorporated herein by reference, it is overmolded on the stem 24. Alternatively, the head 22 is optionally integrally molded with the plate 20 when the head 22 is formed of a substantially rigid material as disclosed by U.S. Pat. No. 6,581,892, which is incorporated herein by reference.

According to one embodiment of the malleable base structure 14 includes a granular substance 26 provided within and substantially filling an interior space or vacuum chamber 28 of a hollow balloon-like envelope or bladder 32 formed of a flexible material that is also substantially impermeable to air, such as plastic or a natural or synthetic rubber such as silicone rubber. The granular substance 26 is formed of granules 34 having relatively low inter-granular friction such that the granules 34 are able to roll and/or slide over one another like marbles in a bag. The low inter-granular friction imparts a fluidic property to the granules 34. The granules 34 may indeed be marbles or glass beads. Alternatively, the granules 34 are lead or steal shot, a metallic powder, or an organic such as flour, sugar or wheat, or the like, or yet another appropriate granular material having low inter-granular friction. The granules 34 are selected for weight and fluidity. Larger granules 34 tend to be relatively lighter due to a lower packing factor, while smaller or finer granules 34 have a higher packing factor so that more of the air in the bladder 32 is replaced by the granular substance 26. Finer substances like flour, sugar, wheat or talcum powder allow the granules 34 to slide easily over one another and thereby impart a relatively high fluidic property to the granular substance 26. The relatively high fluidic property of the granular substance 26 renders it conformable to irregular surfaces such as the pronounced and complex contours 2 of different automotive vehicle dashboards 1 and other interior vehicle surfaces, as illustrated in FIG. 1, including the set of louvers 7 often found near the dashboard's forward edge 8 adjacent to where a windshield is positioned.

As illustrated here by example and without limitation, the frame 16 is coupled to the bladder 32, for example, by a substantially airtight seal 36 around a periphery 38 of the plate 20 such that an internal portion of the plate 20 is sealed within the bladder 32, while an external portion 42 having the presentation structure 18 is exposed external to the bladder 32. The seal 36 may be any substantially airtight seal. For example, the seal 36 may be formed by gluing or otherwise bonding the bladder 32 to the plate 20 using an appropriate adhesive. The seal 36 may alternatively be formed by vulcanizing the bladder 32 to the plate 20. A vacuum is drawn on the bladder 32, whereby most or all of the air within the bladder 32 and from the interstices (interstitial) between adjacent granules 34 of the granular substance 26. The vacuum draws the individual granules 34 of the granular substance 26 tightly together while drawing the bladder 32 and plate 20 tight around the mass of granules 34. The vacuum thus compacts the granular substance 26 and squeezes the bladder 32 and plate 20 into a compact assembly with the compacted granular substance 26.

The vacuum can be drawn on the bladder 32 in several different ways. According to one embodiment, the frame 16 and bladder 32 having the granular substance 26 in place therein are placed together in a vacuum chamber, a vacuum is drawn on the chamber, and the seal 36 is formed with the periphery 38 of the plate 20. Alternatively, airway 44 is provided through the bladder 32, then the seal 36 is formed after the granular substance 26 is emplaced within the bladder 32. Thereafter, the vacuum is drawn on the assembly of the frame 16 and bladder 32 through the airway 44. For example, the assembly is placed in vacuum chamber, and a vacuum is drawn on the chamber, whereby air in the bladder 32 is exhausted through the airway 44. Else, a vacuum pump is attached to the airway 44, and the air in the bladder 32 is exhausted. While the vacuum is maintained in the bladder 32, the airway 44 is sealed. For example, the airway 44 may be heat sealed by melting the material of the bladder 32 to itself. Else, a plug or stopper 45 may be inserted into the airway 44.

According to yet another embodiment, an airway 46 into the bladder 32 is provided through the plate 20 of the frame 16. The air is exhausted from the bladder 32, for example using either a vacuum chamber or a vacuum pump attached to the airway 46. While the vacuum is maintained in the bladder 32, the airway 46 in the plate 20 is sealed. For example, a substantially airtight plug or stopper 48 is inserted into the mating airway 46 through the plate 20. By example and without limitation, as illustrated here the airtight stopper 48 is provided by the presentation structure 18. For example, as illustrated here, a substantially airtight sealing mechanism 50, such as an O-ring, is emplaced between the neck 24 of the presentation structure 18 and the plate 20. The neck 24 includes a threaded portion 52 that is threadedly engaged with mating threads formed in the airway 46 through the plate 20. Alternatively, another airway 46 and mating airtight plug or stopper 48 unrelated to the presentation structure 18 is also contemplated and may be substituted without deviating from the scope and intent of the present invention.

The fluidic property of the granular substance 26 imparts a malleable property to the base structure 14 that is a function of both the type of granules 34 selected and the negative pressure of the vacuum drawn on the bladder 32. The vacuum may be relatively "hard," i.e., relatively more air removed from the bladder 32, or "soft," i.e., relatively less air removed. A harder vacuum renders the base structure 14 relatively less malleable by reducing the fluidity of the granular substance 26, while a softer vacuum renders the base structure 14 relatively more malleable by permitting the granular substance 26 to remain more fluid.

The greater or lesser malleability of the base structure 14 permits deformation by application of a relatively slight pressure and retention of the deformed shape after release of the pressure. The base structure 14 thus operates similarly to a plastically formable substance such as a wet dough, modeling compound or clay. This property distinguishes the present mounting device 10 from both bean bag and malleable metal bases such as the solid base disclosed in U.S. Pat. No. 6,840,487, entitled "Weighted Mounting Platform" issued to the inventor of the present invention on Jan. 11, 2005, the complete disclosure of which is incorporated herein by reference.

Here, the fluidity of the fluidic granular substance 26 combines with the flexibility of the bladder 32 to permit the malleable base structure 14 to be molded to substantially match and thus conform to irregular surfaces such as the pronounced and complex contours 2 of different automotive vehicle dashboards 1 and other interior vehicle surfaces, as illustrated in FIG. 1, including for example the set of louvers 7.

Figure 3:
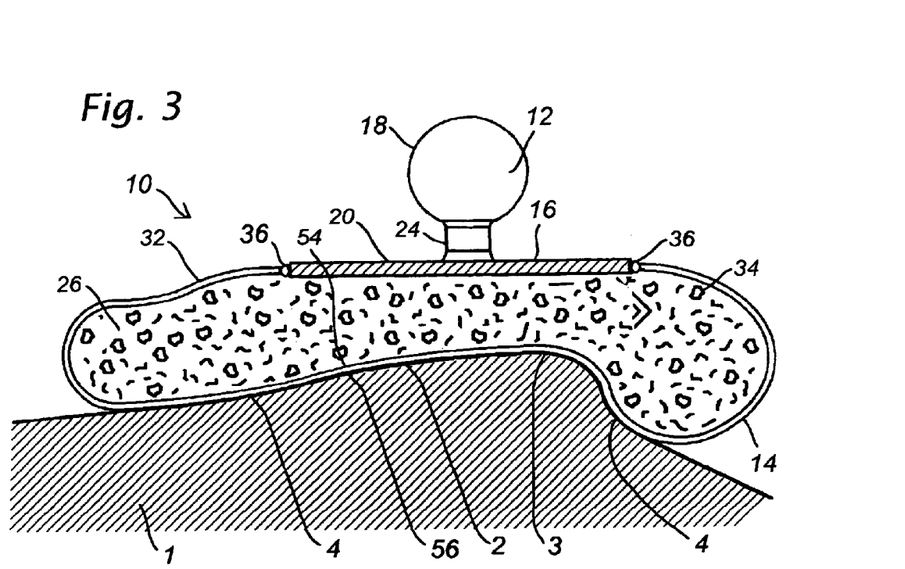
FIG. 3 illustrates the novel adaptive mounting device having a malleable base structure formed of a flexible bladder substantially filled with a substantially fluidic granular substance.

FIG. 3 illustrates the novel adaptive mounting device 10 having the bladder 32 substantially filled with the fluidic granular substance 26. The adaptive mounting device 10 is placed on the vehicle dashboard 1 or another interior vehicle surface with the malleable base structure 14 seated against the surface and mounting structure 12 facing away. The bladder 32 of the malleable base structure 14 is forcibly conformed to the different complex contours 2 of the dashboard 1 or other surface in a desired position by conforming the fluidic granular substance 26. A portion 54 of the malleable base structure 14 thereafter substantially mirrors the different complex contours 2 of the dashboard 1 or other surface.

The greater or lesser vacuum in the bladder 32 limits the fluidity of the granular substance 26. As a result, the malleable base structure 14 retains the mirrored contour portion 54 until the fluidic granular substance 26 in the bladder 32 is forcibly reformed. While the contour portion 54 retains the mirrored shape of the different complex contours 2, the malleable base structure 14 nests with the different complex contours 2. By blanketing one or more of the peaks 3 and dipping into one or more of the valleys 4, the mirrored contour portion 54 stabilizes the base structure 14 on the dashboard 1. Moreover, the fluidic granular substance 26 in the bladder 32 is selected to be sufficiently heavy that its weight presses the base structure's mirrored contour portion 54 firmly into the contours 2. Thereafter, the malleable base structure 14 cannot be easily dislodged, except by lifting the adaptive mounting device 10 away from contact with the contours 2.

At a later time, the contour portion 54 of the malleable base structure 14 is optionally differently contoured to mirror a different portion of the dashboard 1 or an entirely different surface having entirely different complex contours 2. Accordingly, the shape of the contour portion 54 is altered by forcibly conforming the bladder 32 of the malleable base structure 14 to the different complex contours 2 by reconforming the fluidic granular substance 26. Thereafter, the portion 54 of the malleable base structure 14 substantially mirrors the different complex contours 2 of the dashboard 1 or other surface.

The bladder 32 is a tough and flexibly resilient membrane optionally formed of a high surface friction material, such as a Vinyl or a low durometer polyvinylchloride (PVC) material or another suitable plastic material, which operates as a traction enhancing mechanism 56 between the bladder 32 and dashboard 1 or other target surface to avoid slipping and sliding when the containing vehicle is in motion. Such materials as Vinyl and PVC also have the quality of tending to become softer with increasing temperature so that, when warmed to an interior temperature of the vehicle that is comfortable for the passengers, the surface friction of the bladder 32 increases to more effectively avoid slipping and sliding. Additionally, when the covering of the dashboard 1 or other surface is the vacuum-formed ABS or PVC sheet, foamed sheet, synthetic leather-like materials such as vinyl, leather, imitation leather, textile fabric, or the like disclosed in U.S. Pat. No. 4,663,210, which is incorporated herein by reference, such a molded vehicle dashboard 1 or other surface also have the quality of tending to become softer with increasing temperature so that, when warmed to the interior temperature of the vehicle, the surface friction of the dashboard covering also increases to more effectively avoid slipping and sliding of the mating surface of the bladder 32.

Optionally, the plastic material of the bladder 32 is a substantially optically transparent material such that pigments and other additives, objects or artifacts are optionally added to color the fluidic granular substance 26 or decorate the base structure 14 are visible.

The presentation structure 18 is also illustrated here as being continuous with the plate 20 of the frame 16. By example and without limitation, the stem 24 is formed integrally with the plate 20 in a single monolithic structure in a manner whereby any joint or other connection that could compromise the airtight seal of the bladder 32 is eliminated.

Figure 4:
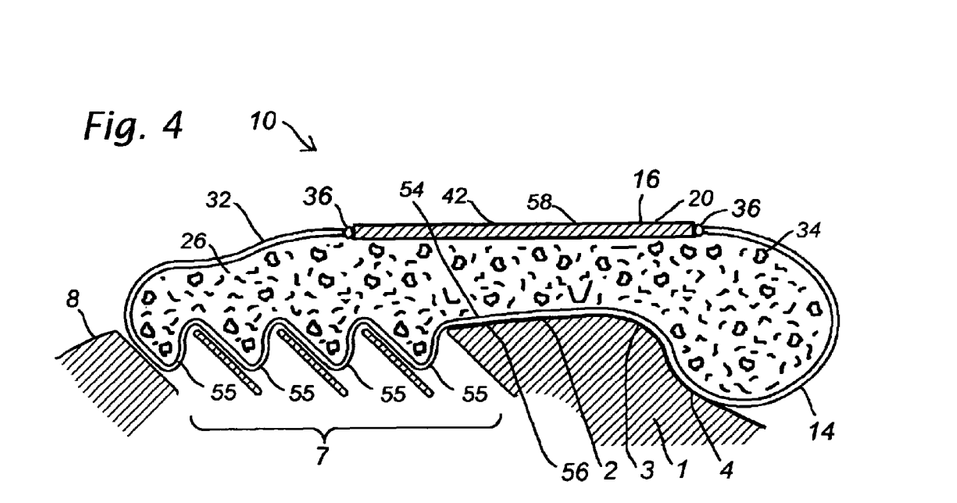
FIG. 4 illustrates the novel adaptive mounting device having a presentation structure being embodied as a suction cup mounting structure.

FIG. 4 illustrates the novel adaptive mounting device 10 having the presentation structure 18 portion of the mounting structure 12 being embodied as a suction cup mounting structure. By example and without limitation, the presentation structure 18 is embodied as a substantially smooth and flat mounting surface 58 formed on the portion 42 of the rigid plate 20 external of the flexible balloon-like container or bladder 32 of the malleable base structure 14. The mounting surface 58 is sufficiently smooth and flat to achieve and retain a vacuum with a suction cup portion of a suction cup mount such as but not limited to the suction cup disclosed in U.S. Pat. No. 6,666,420, entitled "Suction Cup Having Compact Axial Installation And Release Mechanism" issued to the inventor of the present invention on Dec. 23, 2003, the complete disclosure of which is incorporated herein by reference. Accordingly, the mounting surface 58 is exposed external of the flexible bladder 32 of the malleable base structure 14.

The novel adaptive mounting device 10 is also illustrated here as being positioned on the vehicle dashboard 1 or another interior vehicle surface with the malleable base structure 14 seated against the surface and mounting structure 12 facing away. The bladder 32 of the malleable base structure 14 is forcibly conformed to the set of louvers 7 as well as the different complex contours 2 of the dashboard 1 or other surface by conforming the fluidic granular substance 26. Thereafter the contour portion 54 of the malleable base structure 14 substantially mirrors the different complex contours 2 of the dashboard 1 or other surface. Furthermore, one or more extrusions or "fingers" 55 of the contour portion 54 are forcibly extruded into the louvers 7 by pressure exerted on the malleable base structure 14. The mirrored contour portion 54 stabilizes the base structure 14 on the dashboard 1 by blanketing one or more of the peaks 3 and dipping into one or more of the valleys 4 of the contours 2. Moreover, the extrusions 55 of the contour portion 54 extend into the louvers 7 to firmly grip the dashboard 1 or other surface. Thereafter, the malleable base structure 14 cannot be easily dislodged, except by lifting the adaptive mounting device 10 away from contact with the contours 2. Moreover, the weight of the fluidic granular substance 26 in the bladder 32 operates to press the base structure's mirrored contour portion 54 into the contours 2 and louvers 7 and further reinforces the surface friction between the bladder 32 and the dashboard 1 or other surface.

Figure 5:
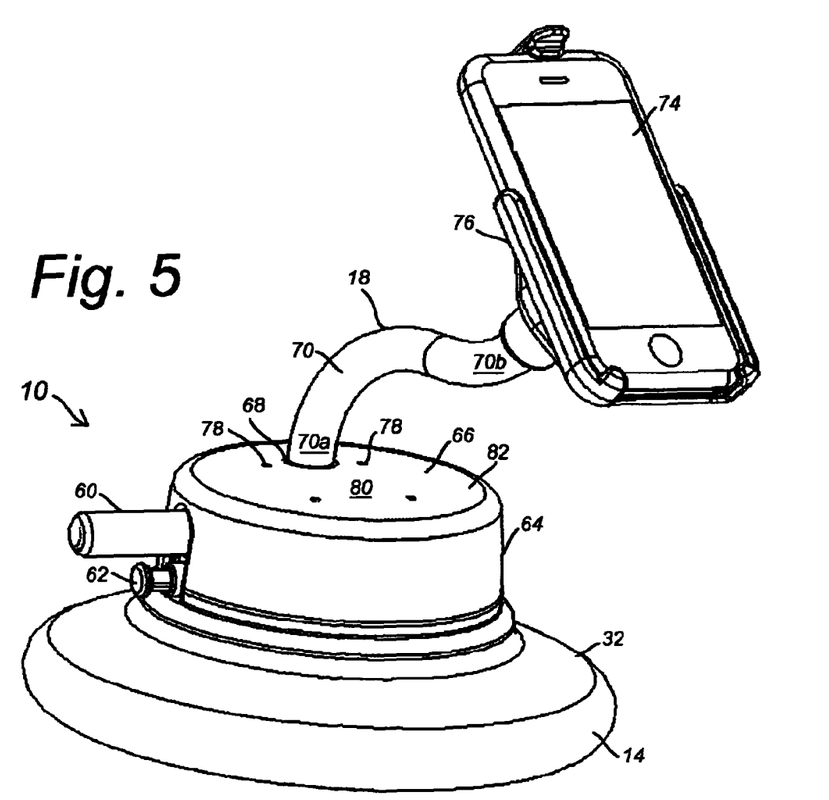
FIG. 5 illustrates the novel adaptive mounting device having a manual vacuum pump and vacuum release control valve both in fluid communication with an interior space or chamber of the bladder of the malleable base structure.

FIG. 5 illustrates the novel adaptive mounting device 10 having a manual vacuum pump 60 and vacuum release control valve 62 both in fluid communication with the interior space or chamber 28 of the bladder 32 of the malleable base structure 14, which is substantially filled with the fluidic granular substance 26. The manual vacuum pump 60 is selected to quickly evacuate air from the interior chamber 28 to substantially degree and thereby create a vacuum therein. The vacuum release control valve 62 is selected to break the vacuum within the interior chamber 28 and permit the bladder 32 to quickly fill with air and return substantially to ambient atmospheric pressure.

When the manual vacuum pump 60 and vacuum release control valve 62 are present, the novel adaptive mounting device 10 optionally includes an additional cover portion 64 structured to provide the coupler or other presentation structure 18 for mounting different paraphernalia. By example and without limitation, the cover 64 is structured to snap onto the rigid plate 20 of the frame 16. Alternatively, the cover 64 is integrated with the vacuum pump 60 and vacuum release valve 62 in a single substantially monolithic structure.

The cover 64 is structured to be substantially rigid and have a substantially universal mounting surface 66. For example, the universal mounting surface 66 includes a blind mounting hole 68 structured to receive and rigidly retain a support apparatus 70 structured as a monolithic flexible rod or "arm" that is formed of a rod of a continuous permanently bendable metal, e.g., aluminum. The permanently bendable metal rod support apparatus 70 is both strong enough to support a cradle coupled to the cover 64 and holding a small electronics device 74, as well as flexible enough to easily arrange a device platform 76 for presenting the cradle and device 74 in a desired position and orientation. By example and without limitation, the flexible support arm 70 is sized in the approximate range of about ⅛ inch to ¼ inch diameter, which provides both the desired strength and flexibility. As illustrated here by example and without limitation, a near end 70a of the flexible support arm 70 is fused to the cover 64, as by electrosonic welding when the cover 64 is formed of a hard plastic, epoxy resin, composite material or electrosonically weldable material, and the device platform 76 is fused to an opposite far end 70b of the flexible support arm 70. When the cover 64 is formed of a metallic material, e.g., aluminum, the flexible support arm 70 is fused by a conventional welding or other conventional metal-fusing process. The cradle is appropriately mounted on the device platform 76, e.g., using one or more fasteners.

The universal mounting surface 66 of the cover 64 also includes a pattern of spaced apart blind mounting holes 78 shown, by example and without limitation, being configured as smooth bores that are amenable to receiving conventional self-tapping screw fasteners.

The universal mounting surface 66 of the cover 64 further includes a substantially smooth and flat mounting surface 80. The mounting surface 80 is sufficiently smooth and flat to be able to achieve and retain a vacuum with a suction cup portion of a suction cup mount such as but not limited to the suction cup disclosed in U.S. Pat. No. 6,666,420, the complete disclosure of which is incorporated herein by reference. Additionally, the mounting hole 68 and the spaced apart holes 78 in the mounting surface 80 are all blind holes positioned central of a peripheral portion 82 of the universal mounting surface 66 of the cover 64 such that they do not compromise the integrity of a suction bond formed between the suction cup mount and the universal mounting surface 66.

Figure 6:
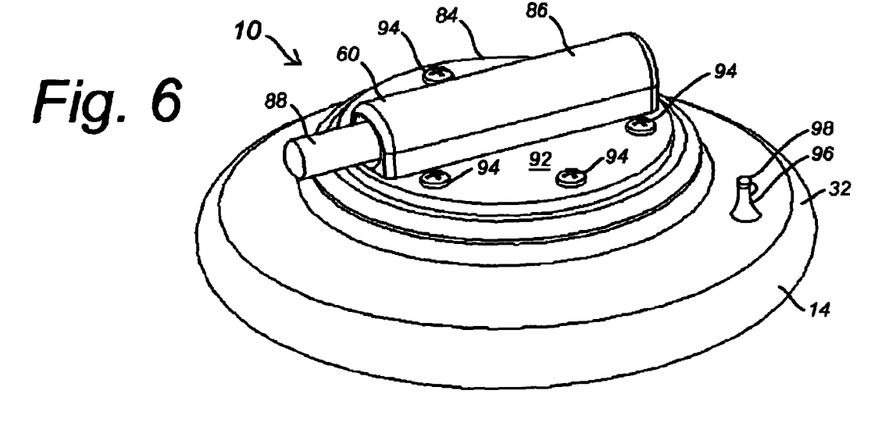
FIG. 6 illustrates the novel adaptive mounting device with the manual vacuum pump and vacuum release control valve both provided as part of a monolithic control base.

FIG. 6 illustrates the novel adaptive mounting device 10 with the cover 64 removed for clarity. As illustrated here by example and without limitation, the manual vacuum pump 60 and vacuum release control valve 62 are both provided as part of a monolithic control base 84. The manual vacuum pump 60 is illustrated here by example and without limitation as including a tubular cylinder 86 and a piston 88 slidably inserted into the tubular cylinder 86 from an open end of the cylinder 86. As illustrated here by example and without limitation, the manual vacuum pump 60 is provided on a cover plate 90 of the control base 84 that is used to capture the bladder 32 against a base plate 92 (shown in subsequent figures) using a plurality of fasteners 94, which also seals the bladder 32 between the cover and base plates 90 and 92. In use, the manual vacuum pump 60 and fasteners 94 are substantially covered by the snap-on cover 64.

As illustrated here, the vacuum release control valve 62 is optionally embodied as a tubular airway 96 through the bladder 32 and sealed by a plastic stopper 98 in the manner of a blow-up beach toy. The vacuum release control valve 62 sealing the bladder 32 is optionally of a ball-and-spring structure.

Figure 7:
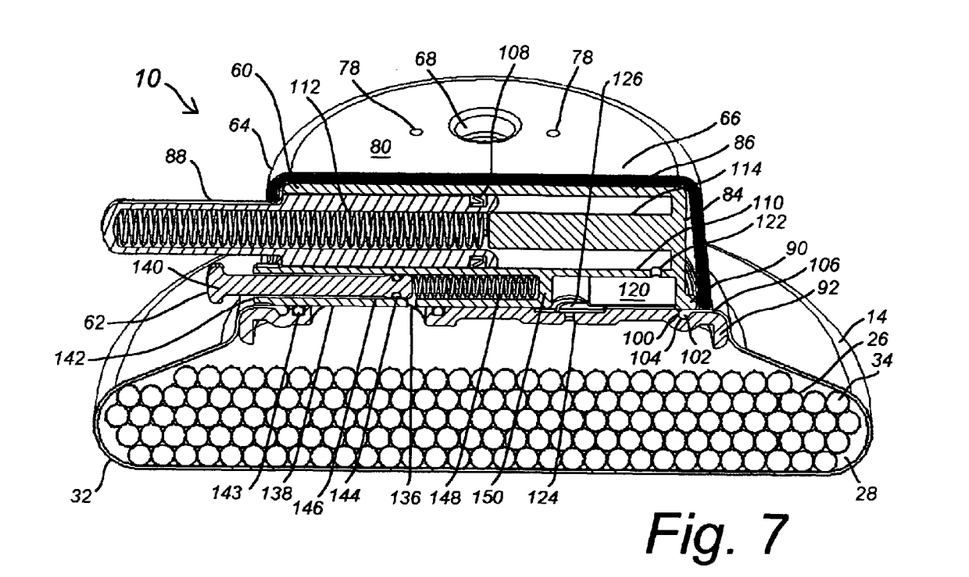
FIG. 7 is a section view of the novel adaptive mounting device showing the bladder of the malleable base structure being substantially filled with the granular substance being formed of substantially spherical granules of lead or steal shot.

FIG. 7 is a section view of the novel adaptive mounting device 10 showing the bladder 32 substantially filled with the granular substance 26 formed of substantially spherical granules 34 of lead or steal shot. The bladder 32 is illustrated here by example and without limitation as having a mouth opening 100 into its interior chamber 28. The opening 100 is shown as being surrounded by an enlarged lip 102 that is sized to fit into an O-ring type recess 104 in an outer surface 106 of the base plate 92. The cover plate 90 having the cylinder 86 of the manual vacuum pump 60 is laid over the lip 102 of the bladder 32, and the fasteners 94 are tightened to compress the lip 102 between the cover plate 90 and the base plate 92, as more clearly illustrated in a subsequent figure. As illustrated here, in addition to sealing the bladder 32 to the outer surface 106 of the base plate 92, the lip 102 of the bladder 32 also forms a substantially airtight seal between the base plate 92 and the cover plate 90 part of the monolithic control base 84.

The piston 88 of the manual vacuum pump 60 is illustrated here as a having a unidirectional or check valve 108 operating against a tubular inside wall 110 of the cylinder 86. A spring 112 reacts against a push rod 114 within the cylinder 86 when the piston 88 is pushed into the cylinder 86. The piston 88 is normally biased by the spring 112 toward an expanded position external of the cylinder 86, as shown here.

Figure 8:
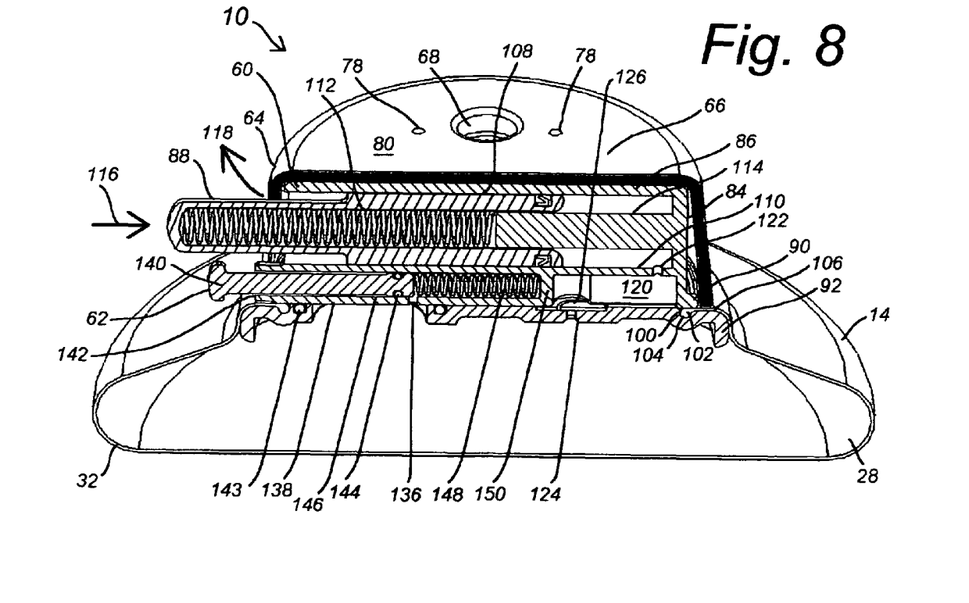
Figure 9:
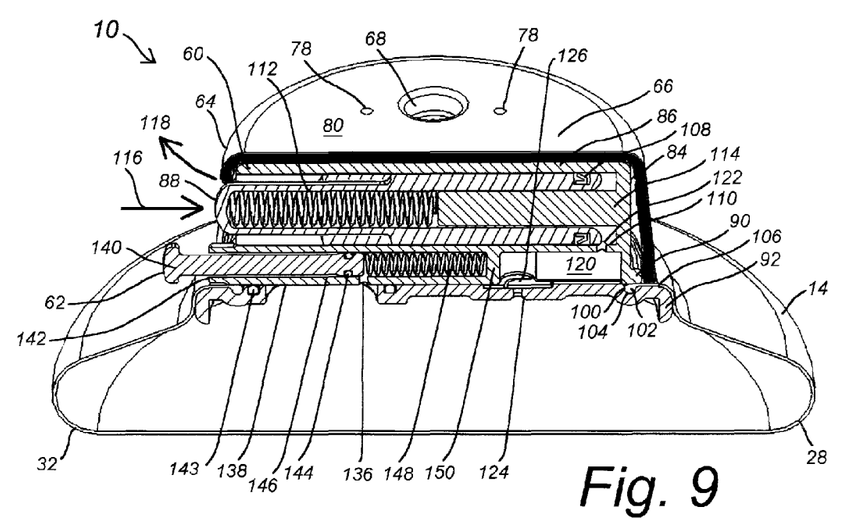

FIGS. 8 and 9 illustrate the novel adaptive mounting device 10 with the granular substance 26 removed for clarity. The piston 88 is illustrated as being pushed (arrow 116) into the cylinder 86 against the spring 112, which compresses air in the cylinder 86. As illustrated, the check valve 108 is adapted to open and allow compressed air to escape out of the cylinder 86 (arrow 118) when the piston 88 is pushed into the cylinder 86 against the spring 112. FIG. 8 illustrates the piston 88 near a midpoint of the cylinder 86 with the spring 112 partially compressed, FIG. 9 illustrates the piston 88 near a maximum extent of the cylinder 88 with the spring 112 substantially fully compressed.

The cylinder 86 is in fluid communication with the interior space or chamber 28 of the hollow bladder 32 by a suction channel 120 that includes an air intake passage 122 through one wall 110 of the cylinder 86 and an air exhaust passage 124 through the base plate 92 into the chamber 28. Another check valve 126 is forced into a closed state when air is compressed in the cylinder 86. The check valve 126 thus blocks the suction channel 120 from the cylinder 86 into the bladder 32, thereby forcing the air to escape around the piston 88 into the ambient atmosphere.

Figure 10:
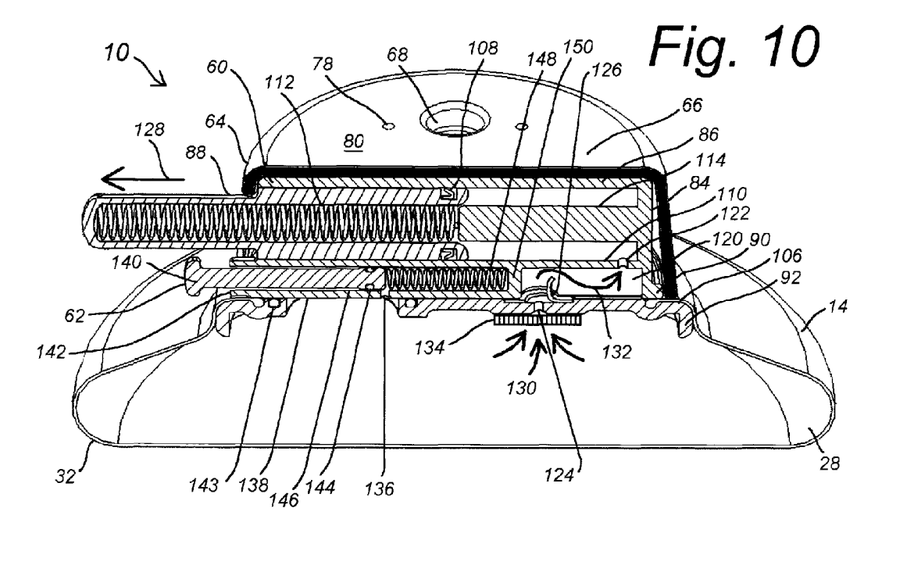
FIG. 10 illustrates the novel adaptive mounting device, wherein an operation of the manual vacuum pump is illustrated for evacuating air from the interior space or chamber of the bladder of the malleable base structure.

FIG. 10 illustrates the novel adaptive mounting device 10 with the granular substance 26 removed for clarity. Operation of the manual vacuum pump 60 is illustrated for evacuating air from the bladder 32. When compression force (arrow 116) is removed from the piston 88, the spring 112 expands and forces the piston 88 outward of the cylinder 86 as illustrated by arrow 128. The check valve 108 on the piston 88 reverses operation to restrict the flow of air into the cylinder 86. The inability to receive air from the ambient atmosphere while the piston 88 expands outwardly creates a vacuum in the cylinder 86. The vacuum in the cylinder 86 is in fluid communication with the suction channel 120 through the air intake passage 122 in the cylinder wall 110. The vacuum in the suction channel 120 automatically opens the second check valve 126 to the air exhaust passage 124 in the base plate 92, which places the vacuum in the cylinder 86 into fluid communication with the interior space or chamber 28 of the bladder 32. As illustrated by arrows 130 and 132, the vacuum in the cylinder 86 sucks air out of the bladder 32 and into the cylinder 86 through the air intake and exhaust passages 122 and 124 of the suction channel 120. Repeated cycling of the piston 88 in the cylinder 86 effectively exhausts the air from the bladder 32. The relative hardness or softness of the vacuum achieved is a function of the piston 88, the spring 112 and the flow area of the smaller of the air intake and exhaust passages 122 and 124.

The second check valve 126 to the air exhaust passage 124 in the base plate 92 is illustrated here as a rubber plate of a flapper valve, but it may be of a ball-and-spring structure. Also, a filter 134 may be positioned over the inlet to the air exhaust passage 124 to keep dust and debris from entering into the cylinder 86 and interfering with operation of the piston check valve 108.

Meanwhile, the vacuum release control valve 62 is adapted to block release of vacuum from the interior chamber 28 of the bladder 32. By example and without limitation, a vacuum exhaust passage 136 is formed through the base plate 92 from the chamber 28 into the bore of a second tubular cylinder 138 formed as part of the monolithic control base 84. As illustrated here, the vacuum release control valve 62 is a ball-and-spring structure having a piston 140 that is slidably inserted into the cylinder 138 from an open end 142. An airtight seal 143, for example an O-ring seal between the base plate 92 and the cover plate 90 portion of the monolithic control base 84, isolates the vacuum exhaust passage 136 from the air exhaust passage 124 and the suction channel 120 into the cylinder 86.

A unidirectional or check valve 144 operating against a tubular inside wall 146 of the cylinder 138. A spring 148 reacts against a closed end wall 150 of the tubular cylinder 138 when the piston 140 is pushed into the cylinder 138. The piston 140 is normally biased by the spring 148 toward an expanded position external of the cylinder 138, as shown here. In this expanded position of the piston 140, the check valve 144 is an O-ring positioned between the vacuum exhaust passage 136 and the open end 142 of the cylinder 138. A vacuum created in the interior chamber 28 of the bladder 32 will operate through the vacuum exhaust passage 136 to compress the piston 140 against the biasing spring 148. When sufficiently strong or hard, the vacuum in the bladder 32 will compress the spring 148 until the check valve 144 opens the vacuum exhaust passage 136 and leaks ambient air into the bladder chamber 28. The vacuum release control valve 62 is thus a second limitation on the relative hardness or softness of the vacuum achieved in the bladder 32, as a function of the piston 140, the spring 148 and the area of the vacuum exhaust passage 136.

The flapper valve 126 or the simple plastic stopper 98 are also contemplated and may be substituted for the vacuum release control valve 62 without deviating from the scope and intent of the present invention. Alternatively, a ball-and-spring structure is also contemplated and may be substituted for the vacuum release control valve 62 without deviating from the scope and intent of the present invention.

Figure 11:
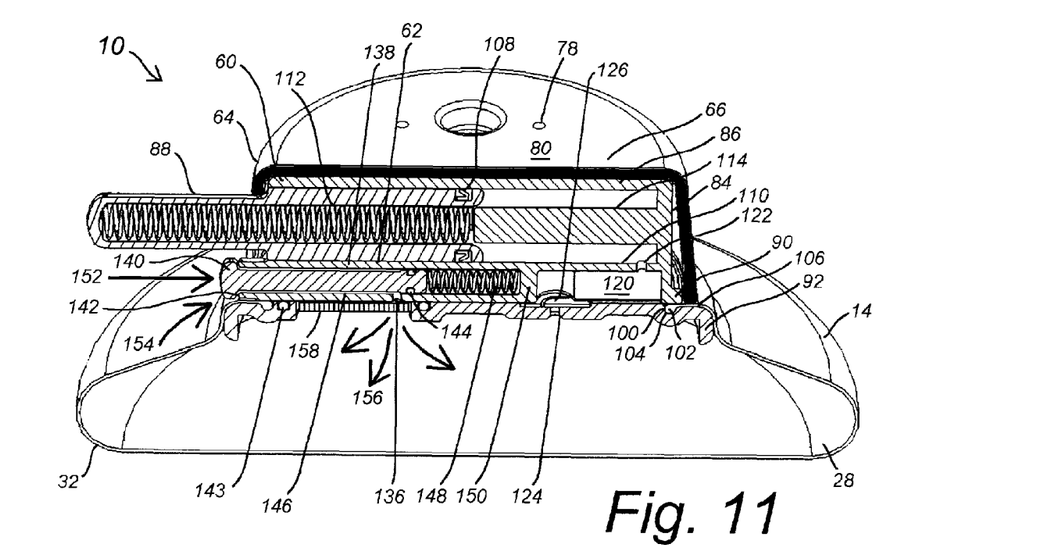
FIG. 11 illustrates the novel adaptive mounting device, wherein an operation of the vacuum release control valve is illustrated for releasing vacuum from the interior chamber of the bladder.

FIG. 11 illustrates the novel adaptive mounting device 10 with the granular substance 26 removed for clarity. Operation of the vacuum release control valve 62 is illustrated for releasing vacuum from the interior chamber 28 of the bladder 32. The piston 140 is pushed (arrow 152) against the spring 148 until it compresses enough to move the check valve 144 inwardly of the cylinder 138 past the vacuum exhaust passage 136. Once the check valve 144 opens the vacuum exhaust passage 136, ambient air flows (arrow 154) around the piston 140 and through the vacuum exhaust passage 136 (arrows 156) into the bladder chamber 28 until pressure in the bladder 32 equalizes with ambient atmospheric pressure.

Optionally, a filter 158 may be positioned over the inlet to the vacuum exhaust passage 136 to keep dust and debris from entering into the bladder 32 and fouling its interior chamber 28, which dust and debris could be drawn through the air exhaust passage 124 during subsequent cycling of the vacuum pump 60 and interfere with operation either of the suction channel check valve 126 or piston check valve 108.

Figure 12:
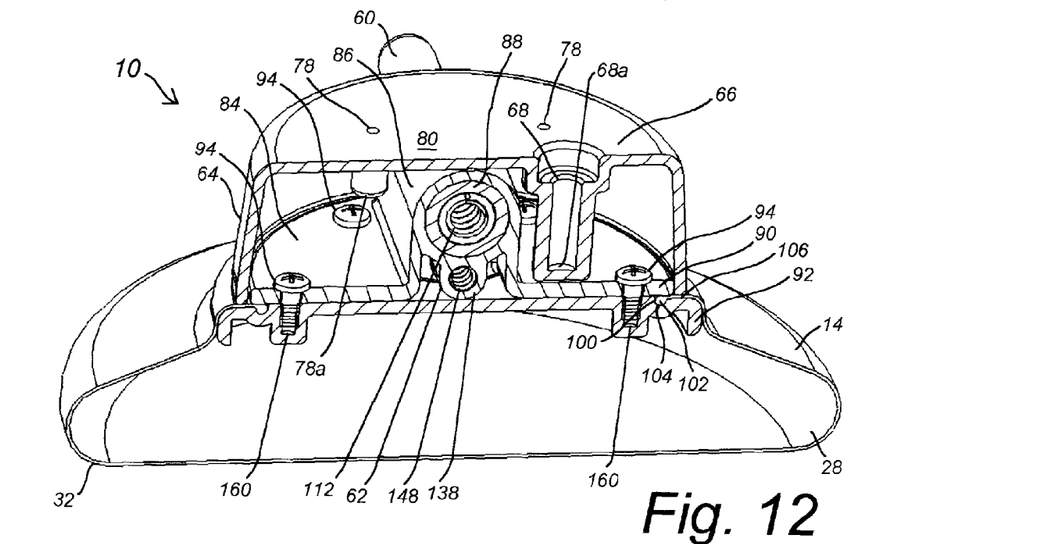
FIG. 12 illustrates the novel adaptive mounting device, wherein a seal around an opening into the interior chamber of the bladder is formed.

FIG. 12 is another section view of the novel adaptive mounting device 10 taken through respective cylinders 86 and 207 of the manual vacuum pump 60 and vacuum release control valve 62, and having the granular substance 26 removed for clarity. Here, the novel adaptive mounting device 10 is illustrated with the granular substance 26 removed for clarity. This enlarged lip 102 surrounding the mouth opening 100 of the bladder 32 is illustrated as being fit into the O-ring type recess 104 in the outer surface 106 of the base plate 92. The cover plate 90 portion of the monolithic control base 84 is laid over the lip 102 of the bladder 32, and a plurality of the fasteners 94 are tightened to compress the lip 102 between the cover plate 90 and the base plate 92. The compressed lip 102 seals the opening 100 and, by example and without limitation simultaneously seals the cover plate 90 with the base plate 92.

The fasteners 94 are self-tapping screws threaded in to holes 160 in the base plate 92. The holes 160 are blind ended to avoid compromising the vacuum chamber 28 of the bladder 32.

Both the mounting hole 68 for the flexible rod 70 and the pattern of spaced apart mounting holes 78 in the cover's universal mounting surface 66 are shown as being blind ended to avoid compromising the integrity of the substantially smooth and flat suction cup mounting surface 80. By example and without limitation, the mounting hole 68 is illustrated as being formed with a blind end 68a, and one of the self-tap mounting holes 78 is illustrated as having a bind end 78a.

Figures 13, 14:
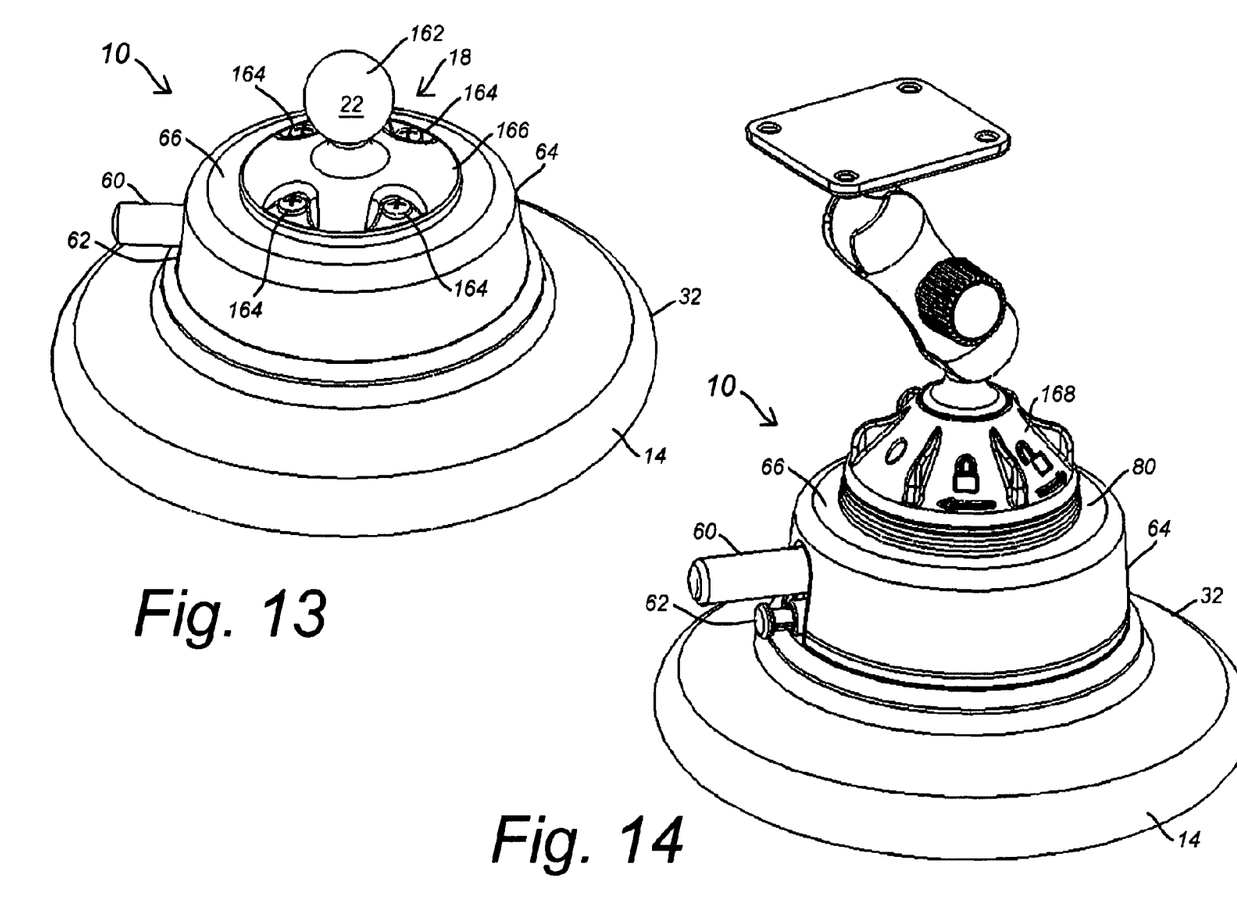
FIG. 13 illustrates the novel adaptive mounting device used to mount a ball-end mount or "coupler"
FIG. 14 illustrates the novel adaptive mounting device, wherein a suction cup mount is mounted to a substantially smooth and flat mounting surface of a cover portion.

FIG. 13 illustrates the novel adaptive mounting device 10 used to mount a ball-end mount or "coupler" 162 of the type disclosed in U.S. Pat. No. 5,845,885, the complete disclosure of which is incorporated herein by reference. For example, a plurality of self-tapping screw fasteners 164 are threaded into the pattern of spaced apart blind mounting holes 78 for securing a base 166 of the coupler 162 the universal mounting surface 66 of the cover 64 to provide the presentation structure 18 for mounting different paraphernalia.

FIG. 14 illustrates the novel adaptive mounting device 10, wherein a suction cup mount 168 is mounted to the substantially smooth and flat mounting surface 80 of the cover 64. By example and without limitation, the suction cup mount 168 includes but is not limited to the suction cup disclosed in U.S. Pat. No. 6,666,420, the complete disclosure of which is incorporated herein by reference, or another suction cup mounting device.

While the preferred embodiment of the invention has been illustrated and described, it will be appreciated that various changes can be made therein without departing from the spirit and scope of the invention.

What is claimed is:

1. An adaptive mounting device, comprising:
 a substantially rigid base plate;
 a hollow bladder formed of a flexible material that is substantially impermeable to air;
 a substantially airtight seal formed between the base plate and an opening into the bladder;
 a granular substance substantially filling the bladder; and
 at least a partial vacuum formed inside the bladder.

2. The device of claim 1, further comprising a sealable airway into a vacuum chamber interior of the bladder and substantially filled with the granular substance.

3. The device of claim 2 wherein the sealable airway further comprises a secondary opening into the bladder, and wherein the sealable airway is further sealed with a substantially airtight seal.

4. The device of claim 2 wherein the sealable airway further comprises a passage formed through the base plate, and further comprising a stopper; and
 a substantially airtight seal between the stopper and the sealable airway.

5. The device of claim 2, further comprising a vacuum generator coupled in fluid communication with the interior of the bladder.

6. The device of claim 5, further comprising a vacuum release valve coupled in fluid communication with the interior of the bladder.

7. The device of claim 5 wherein the vacuum generator further comprises a manual vacuum pump coupled to the base plate.

8. An adaptive mounting device, comprising:
- a substantially malleable base structure comprising a bladder comprising a flexible and substantially air impermeable material and forming a vacuum chamber therewithin, and a granular substance substantially filling the vacuum chamber;
- a mounting structure having a frame supporting a presentation structure at least partially external of the bladder;
- a substantially air impermeable seal between the bladder and a portion of the frame; and
- at least a partial vacuum formed within the bladder.

9. The device of claim 8, further comprising: a sealable airway into the vacuum chamber; and
- a substantially air impermeable seal sealing the sealable airway.

10. The device of claim 9, further comprising: a manual vacuum pump coupled to the frame; and
- a suction channel formed between an intake of the vacuum pump and the vacuum chamber of the bladder.

11. The device of claim 10, further comprising: a manual vacuum release control valve in fluid communication with the vacuum chamber.

12. The device of claim 11 wherein the frame further comprises a universal mounting surface.

13. The device of claim 12 wherein the universal mounting surface further comprises at least a substantially smooth and flat suction cup mounting surface.

14. The device of claim 13 wherein the universal mounting surface further comprises a plurality of blind mounting holes.

15. The device of claim 14 wherein at least a portion of the plurality of blind mounting holes further comprises a pattern of blind holes comprising substantially smooth bores for receiving conventional self-tapping screw fasteners.

16. An adaptive mounting device, comprising:
- a substantially malleable base structure comprising a bladder comprising a flexible and substantially air impermeable material and forming a vacuum chamber therewithin, and a granular substance substantially filling the vacuum chamber;
- a mounting structure comprising a means for supporting a presentation structure at least partially external of the bladder;
- a means for forming a substantially air impermeable seal between the bladder and a portion of the frame; and
- a means for generating at least a partial vacuum within the vacuum chamber.

17. The device of claim 16, further comprising a suction channel formed between the vacuum chamber of the bladder and the means for generating at least a partial vacuum.

18. The device of claim 17, wherein the means for generating at least a partial vacuum further comprises a manual vacuum pump coupled to the frame.

19. The device of claim 16, further comprising: a means for manually releasing a vacuum formed in the vacuum chamber, the means for manually releasing a vacuum being coupled in fluid communication with the vacuum chamber.

20. The device of claim 19 wherein the a means for manually releasing a vacuum formed in the vacuum chamber further comprises a vacuum release control valve in fluid communication with the vacuum chamber.

* * * * *